(12) United States Patent
Guldenschuh et al.

(10) Patent No.: US 12,305,771 B2
(45) Date of Patent: May 20, 2025

(54) FILLING AN ARMATURE CHAMBER IN AN ACTUATOR

(71) Applicant: ZF Friedrichshafen AG, Friedrichshafen (DE)

(72) Inventors: Dominik Guldenschuh, Freiburg (DE); Markus Moosmann, Grünkraut (DE); Markus Diesch, Bierstetten (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 17 days.

(21) Appl. No.: 18/300,773

(22) Filed: Apr. 14, 2023

(65) Prior Publication Data

US 2023/0332711 A1 Oct. 19, 2023

(30) Foreign Application Priority Data

Apr. 14, 2022 (DE) .......................... 102022203776.6

(51) Int. Cl.
*F16K 31/06* (2006.01)
*F16K 47/00* (2006.01)
*H01F 7/08* (2006.01)
*H01F 27/33* (2006.01)

(52) U.S. Cl.
CPC ...... *F16K 31/0696* (2013.01); *F16K 31/0675* (2013.01); *F16K 47/0111* (2021.08); *H01F 7/081* (2013.01); *H01F 7/088* (2013.01); *H01F 27/33* (2013.01); *H01F 2007/086* (2013.01)

(58) Field of Classification Search
CPC ............. F16K 31/0696; F16K 31/0693; F16K 47/0111; H01F 27/33; H01F 7/088; H01F 7/1607; H01F 2007/086
See application file for complete search history.

(56) References Cited

U.S. PATENT DOCUMENTS

| 4,531,708 A | * | 7/1985 | Livet | ................... F16K 31/0651 |
| | | | | 251/48 |
| 4,595,170 A | * | 6/1986 | Livet | ...................... F16K 47/00 |
| | | | | 251/129.08 |
| 2023/0151903 A1 | * | 5/2023 | Iwanaga | ............. F16K 31/0693 |
| | | | | 251/129.15 |

FOREIGN PATENT DOCUMENTS

| CN | 114076223 A | * | 2/2022 | ........ F16K 31/0686 |
| DE | 10 2013 213 713 A1 | | 1/2015 | |
| DE | 102018000058 A1 | * | 7/2019 | ............ F16K 31/06 |
| JP | 2001-41339 A | | 2/2001 | |
| JP | 2001041339 A | * | 2/2001 | |

OTHER PUBLICATIONS

Office Action dated Oct. 26, 2022 for German Patent Application No. 10 2022 203 776.6, note: pp. 1 and 2 are English language Explanations to Section C. Result of Determination Document (12 pp.).

* cited by examiner

*Primary Examiner* — Atif H Chaudry
(74) *Attorney, Agent, or Firm* — Crowell & Moring LLP

(57) ABSTRACT

An actuator for an assembly in a motor vehicle may have a moving armature in an armature chamber, where the actuator has a fluid path that is configured for fluid transfer between the armature chamber and a fluid reservoir in the assembly when the actuator is installed in an assembly, where the actuator is configured to fill the armature chamber with fluid, in particular oil, when the armature moves axially, thereby drawing fluid into the armature chamber when the actuator is operated in a fluid chamber, in particular an oil chamber.

9 Claims, 2 Drawing Sheets

FILLING AN ARMATURE CHAMBER IN AN ACTUATOR

RELATED APPLICATION

This application claims the benefit of, and priority to, German Patent Application DE 10 2022 203 776.6, filed Apr. 14, 2022, which is hereby incorporated by reference herein in its entirety.

FIELD OF THE INVENTION

The present invention relates to an electromagnetic actuator for an assembly that has a fluid chamber, e.g. a transmission.

BACKGROUND AND SUMMARY

With conventional multi-stage motor vehicle automatic transmissions or automated motor vehicle manual transmissions, hydraulic shifting elements in the form of clutches or brakes are used to shift to different gears. A fluid pressure corresponding to the desired gear ratio is applied to or removed from (the pressure is reduced) the hydraulic shifting element in order to shift to or engage the desired gear for this. Fluid valves with electromagnetic actuators are used for this. One example of such a fluid valve is disclosed in DE 10 2013 213 713 A1.

In view of this background, the present embodiments related to an electromagnetic actuator for an assembly, in particular in a motor vehicle, which has a moving armature in an armature chamber, in which the actuator has a fluid path that is configured for fluid transfer between the armature chamber and a fluid reservoir in the assembly when the actuator is installed in an assembly, and the actuator is configured to fill the armature chamber with fluid, in particular oil, in that the armature moves axially, drawing fluid into the armature chamber, when the actuator is operated inside a fluid chamber, in particular an oil chamber.

An actuator is configured to actuate a shifting element in a transmission, and is connected to a control unit for the transmission. Actuators are the counterparts of sensors with regard to transducers, and form the actuators in a control circuit. They convert signals in a control process with which control values are set. One example of this is opening and closing a valve.

A housing is a solid shell that protects its sensitive contents, or protects the surroundings thereof from hazardous contents.

Fluids are liquids or gases. In this patent application, an appropriate fluid is oil, for example.

A fluid chamber is a chamber filled with fluid in a transmission. If the fluid is an oil, the fluid chamber is referred to as an oil chamber.

A labyrinth structure results in a longer fluid path. This fluid path may change directions numerous times. This increases the flow resistance in the fluid.

The fundamental idea of the invention is to create a fluid path between an armature chamber in an electromagnetic actuator, and a fluid chamber in an assembly, in which the actuator can be installed, that ensures that the actuator is filled with fluid from the fluid chamber when it is in operation. This eliminates the necessity of filling the actuator with fluid in a separate process prior to its installation.

Advantageous designs and developments of the invention can be derived from the dependent claims and the description in reference to the drawings.

According to a preferred embodiment of the invention, the armature chamber dampens movement in that the armature chamber has a first fluid reservoir and a second fluid reservoir, which are connected to a fluid path for fluid transfer by a choke.

The damping is defined by the dimensions of the fluid path. The fluid path ensures that fluid can flow back and forth between the first and second fluid reservoirs when the armature moves.

According to a preferred embodiment of the invention, fluid cannot be drained from the armature chamber when the actuator is in operation because the fluid path in the choke has a lower flow resistance than the fluid path between the actuator and the assembly.

This ensures that the fluid from the moving choke does not flow out of the fluid path between the actuator and the assembly, but instead is drained into the other fluid reservoir through the fluid path in the choke.

According to a preferred embodiment of the invention, the fluid path in the choke is formed by a hole or recess in a surface of the choke. In the case of a hole, the movement resistance of the armature can be adjusted in a targeted manner to the requirements of the system via damping covers.

According to a preferred embodiment of the invention, the fluid path between the actuator and the assembly is in the form of a labyrinth. Because of the labyrinth structure of the fluid path, there are so-called still areas in the fluid path, which ensure that particles such as dirt settle, and do not enter the armature chamber.

According to a preferred embodiment of the invention, the actuator is configured to fill the armature chamber with fluid in a filling sequence comprising a predefined number of axial movements of the armature.

The actuator is therefore configured to automatically fill its armature chamber with fluid as soon as it is operational in an assembly.

According to a preferred embodiment of the invention, the armature chamber can also be drained through the fluid path between the actuator and the assembly.

An exemplary actuator according to one embodiment of the invention comprises a housing, a magnetic coil, which radially encompasses an interior chamber, a pole tube, which extends into the interior chamber encompassed by the coil, a core, which extends into the interior chamber encompassed by the coil and is axially opposite the pole tube, an armature that can move axially in an armature chamber, and a bearing, in which at least the core and the pole tube form the armature chamber, the choke forms the armature cover in the armature chamber, and the armature comprises an armature rod, and the armature rod is supported by the bearing, and a gap is formed between the pole tube and the bearing resulting in a fluid path between the actuator and the assembly for filling the armature chamber with fluid.

It is understood that an assembly for a motor vehicle such as a transmission, cooling circuit, damping unit, etc., which has at least one electromagnetic actuator located inside a fluid chamber in the assembly, is advantageous.

It is also understood that a method for filling an electromagnetic actuator such as that described above is advantageous. The method comprises the steps, "installing the actuator in a fluid chamber in an assembly," "filling the fluid chamber with fluid," and "starting a filling process comprising one or more axial movements of the armature in order to fill the armature chamber with fluid."

This ensures that the electromagnetic actuator is filled with fluid after it is installed in an assembly.

DESCRIPTION OF THE DRAWINGS

The present invention shall be explained in greater detail below in reference to the exemplary embodiments illustrated schematically in the drawings. Therein.

DETAILED DESCRIPTION OF THE DRAWINGS

Figure 1:
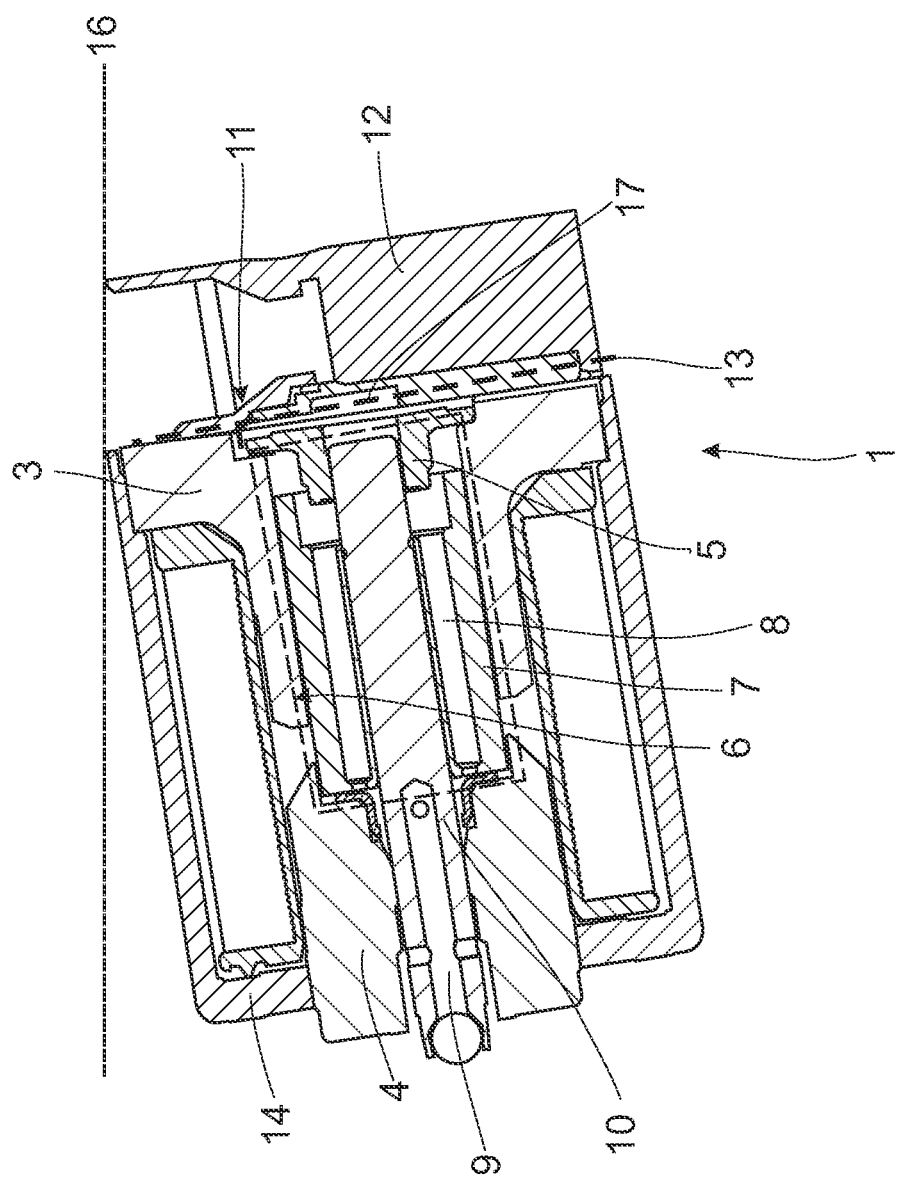
FIG. 1 shows a schematic cutaway view of an electromagnetic actuator according to one embodiment of the invention.

The drawings should provide a better understanding of the embodiments of the invention. They illustrate embodiments with which the principles and concepts of the invention are explained in conjunction with the description. Other embodiments and many of the advantages can be derived from the drawings. The elements in the drawings are not necessarily drawn to scale.

Elements, features and components in the drawings that are identical, functionally identical, and have the same functions all have the same reference symbols, unless otherwise specified.

Aspects of the invention relating to oil are referred to as fluids below. It is to be understood that the selection of oil as a fluid is merely of an exemplary nature, and does not limit the scope of protection for this patent application.

FIG. 1 shows a schematic cutaway view of an electromagnetic actuator 1 that has a magnetic coil 2, a pole tube 3, a core 4, a bearing 5, and an armature 10, all of which are enclosed in a housing 14.

The magnetic coil 2 forms an interior chamber in the actuator with the housing 14, in which the pole tube 3 and the core 4 are located. The pole tube 3 and core 4 are axially opposite one another and delimit an armature chamber 6 that contains an armature 10. The armature 10 comprises a choke in the form of an armature cover 7 in FIG. 1, which is radially inside the pole tube 3 and the core 4. There is an armature rod 8 inside the armature cover 7, which is supported in a bearing 5. The bearing 5 forms a receiver for the armature rod 8 and lies on the pole tube 3 at a stop on the bearing 5 such that a gap 15 is formed between the bearing 5 and the pole tube 3, which serves as the oil path 11 and a drain for the armature chamber. The gap 15 has a labyrinth structure that prevents dirt or particles from entering the armature chamber 6.

Oil flows between a first fluid reservoir 19 and second fluid reservoir 20 in the armature chamber when the armature cover 7 moves axially. Fluid passes from one fluid reservoir 19, 20 to the other fluid reservoir 20, 19 when the oil is conveyed through the fluid path in the form of a hole 9 in the armature cover 7 by the movement of the armature cover 7.

A protective cover 13 is placed on the pole tube 3 and the bearing 5 at the bearing end of the armature chamber that prevents shavings from entering the armature chamber. A receiver 12 for a plug-in connector is also attached to the pole tube 3.

The armature rod 8 is formed along a longitudinal axis of the actuator 1, and therefore also defines the axial direction of movement for the armature 10.

Line 16 indicates the oil level in the transmission. This shows that the actuator 1 is entirely immersed in the transmission fluid. Gravity therefore prevents a draining of the actuator when it is in operation.

Figure 2:
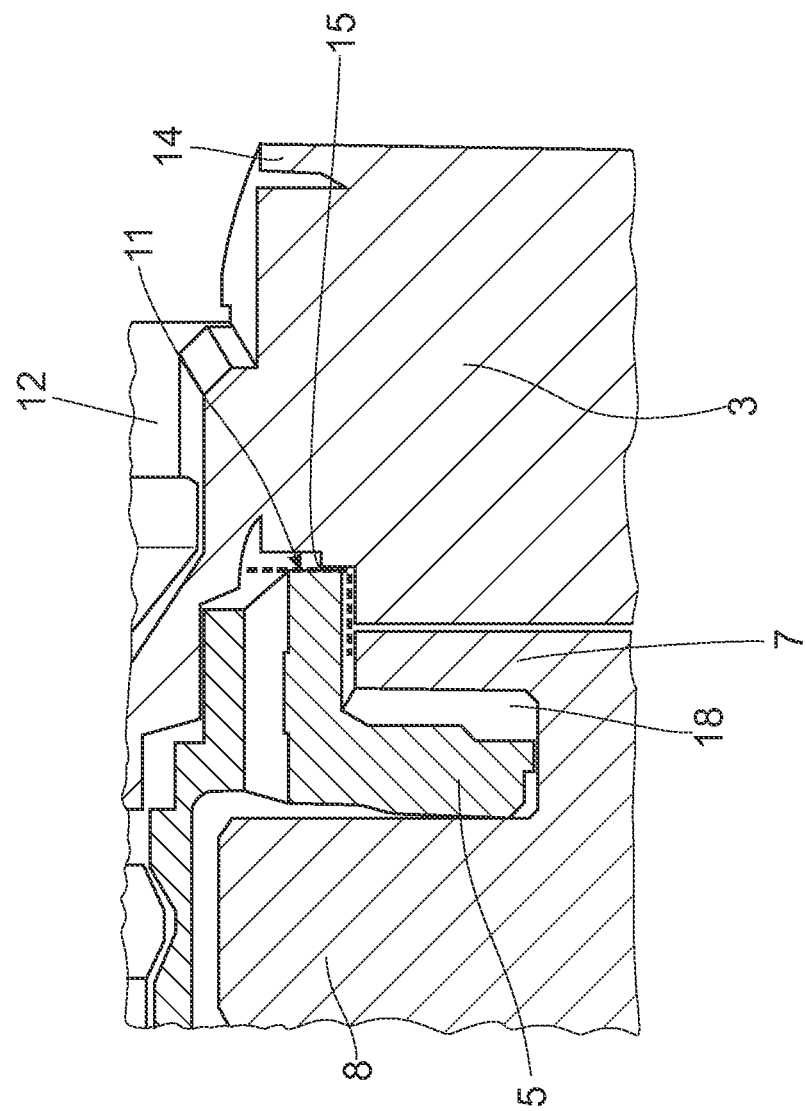
FIG. 2 shows a detail of FIG. 1.

FIG. 2 shows a detail of FIG. 1 in which the gap 15, or the oil path 11 between the pole tube 3 and the bearing 5 is illustrated. This shows how oil passes through the gap 15 into a chamber 18 in the armature cover 7 that the hole 9 opens into.

Figure 3:
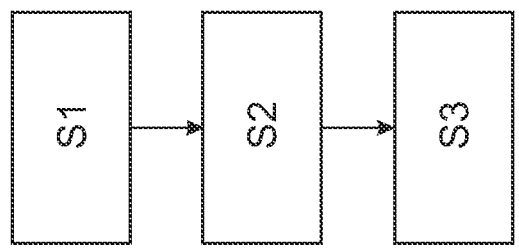
FIG. 3 shows a schematic block diagram of a method according to one embodiment of the invention.

FIG. 3 shows a schematic block diagram of a method for filling an electromagnetic actuator with oil. The method comprises steps S1 to S3. In the first step S1, the actuator is installed in an oil chamber in a transmission. In the next step S2, the oil chamber in the transmission is filled with oil. In the following step S3, a filling sequence comprising one or more axial movements of the armature is started, in order to fill the armature chamber with oil.

REFERENCE SYMBOLS 1 actuator
2 coil
3 pole tube
4 core
5 bearing
6 armature chamber
7 choke
8 armature rod
9 fluid path
10 armature
11 fluid path
12 receiver
13 protective cover
14 housing
15 gap
16 oil level
17 still area
18 chamber
19 first fluid reservoir
20 second fluid reservoir
S1-S3 method steps

The invention claimed is:

1. An electromagnetic actuator for an assembly in a motor vehicle, the electromagnetic actuator comprising:
    a magnetic coil, which radially encompasses an interior chamber;
    a pole tube which extends into the interior chamber encompassed by the coil;
    a bearing; and
    a moving armature located at least partially in an armature chamber,
    wherein the armature comprises an armature rod, and the armature rod is supported by the bearing,
    wherein the actuator has a first fluid path that is configured for fluid transfer between the armature chamber and a fluid reservoir in an assembly when the actuator is installed in an assembly,
    wherein the actuator is configured to fill the armature chamber with fluid when the armature moves axially via drawing the fluid into the armature chamber when the actuator is operated in a fluid chamber,
    wherein the armature chamber has a first fluid reservoir and a second fluid reservoir, wherein the first and second fluid reservoirs are connected to a second fluid path in a choke for fluid transfer by a choke such that the armature chamber dampens movement,
    wherein the second fluid path in the choke has a lower flow resistance than the first fluid path when the actuator is in operation, wherein a gap is formed between the pole tube and the bearing that results in the first fluid path for filling the armature chamber with fluid, and wherein the fluid is oil.

2. The electromagnetic actuator of claim 1, wherein the fluid chamber is an oil chamber.

3. The electromagnetic actuator according to claim 1, wherein when the actuator is in operation, the fluid is not drainable from the armature chamber.

4. The electromagnetic actuator according to claim 1, wherein the second fluid path in the choke is formed by a hole or recess in a surface of the choke.

5. The electromagnetic actuator according to claim 1, wherein the first fluid path forms a labyrinth.

6. The electromagnetic actuator according to claim 1, wherein the actuator is configured to fill the armature chamber with the fluid in a filling sequence that comprises a predefined number of axial movements of the armature.

7. The electromagnetic actuator according to claim 1, wherein the first fluid path is configured to drain the armature chamber.

8. The electromagnetic actuator according to claim 1, further comprising:
   a housing; and
   a core, which extends into the interior chamber encompassed by the coil, and is axially opposite the pole tube,
   wherein the core and the pole tube form the armature chamber, and
   wherein the choke forms an armature cover.

9. An assembly for a motor vehicle, the assembly having the fluid chamber and the electromagnetic actuator according to claim 1 located in the fluid chamber.

\* \* \* \* \*